US011522696B2

(12) United States Patent
Kulkarni et al.

(10) Patent No.: US 11,522,696 B2
(45) Date of Patent: Dec. 6, 2022

(54) INTRUSION DEFENSE SYSTEM FOR A VEHICLE

(71) Applicant: Dearborn Group, Inc., Farmington Hills, MI (US)

(72) Inventors: Prakash K. Kulkarni, Novi, MI (US); Mark P. Zachos, West Bloomfield, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 85 days.

(21) Appl. No.: 17/201,096

(22) Filed: Mar. 15, 2021

(65) Prior Publication Data

US 2021/0288801 A1 Sep. 16, 2021

Related U.S. Application Data

(60) Provisional application No. 62/989,263, filed on Mar. 13, 2020.

(51) Int. Cl.
*H04L 9/32* (2006.01)
*G06F 21/55* (2013.01)

(52) U.S. Cl.
CPC .............. *H04L 9/32* (2013.01); *G06F 21/554* (2013.01)

(58) Field of Classification Search
CPC ....................................................... H04L 9/32
See application file for complete search history.

(56) References Cited

U.S. PATENT DOCUMENTS

| 8,925,083 | B2 | 12/2014 | Niner et al. |
| 9,336,239 | B1 | 5/2016 | Hoffmann et al. |
| 9,935,774 | B2* | 4/2018 | Sharma ................. H04L 9/3242 |
| 10,095,634 | B2 | 10/2018 | Sharma |
| 10,142,303 | B2 | 11/2018 | Avanzi et al. |
| 10,263,777 | B2 | 4/2019 | Shields et al. |
| 10,326,793 | B2 | 6/2019 | Wesie et al. |
| 10,389,744 | B2 | 8/2019 | Hartkopp et al. |
| 10,403,058 | B2* | 9/2019 | Daily ................... G07C 5/0841 |
| 10,574,305 | B2 | 2/2020 | Lu et al. |
| 10,630,699 | B2 | 4/2020 | Galula et al. |
| 10,659,477 | B2 | 5/2020 | Choi et al. |
| 10,754,997 | B1 | 8/2020 | Daily et al. |
| 2015/0067864 | A1* | 3/2015 | Barkan ................. G06F 21/561 726/24 |
| 2018/0300477 | A1* | 10/2018 | Galula ................ H04L 63/1416 |
| 2021/0288801 | A1* | 9/2021 | Kulkarni ............... H04L 9/0643 |

FOREIGN PATENT DOCUMENTS

| EP | 2987729 A1 * | 2/2016 | ............. B64D 45/00 |
| WO | WO-2016151566 A1 * | 9/2016 | ............ G06F 21/554 |

* cited by examiner

*Primary Examiner* — Ponnoreay Pich
(74) *Attorney, Agent, or Firm* — Warn Partners, P.C.

(57) ABSTRACT

An Intrusion Defense System for protecting the computer systems of a vehicle includes a vehicle having a computer with a direct wired or Radio frequency or other contact-less remote connection diagnosis connection port interface. A hardware device for protecting the computer from hazardous software code intrusions into the computer system. is used to protect the computer from unwanted hacks or intrusions into the system. The hardware device includes at least one or more of: a Diagnostic Port Gateway; a CAN Conditioner; and a CAN Data Security Diode and combinations of these.

22 Claims, 4 Drawing Sheets

INTRUSION DEFENSE SYSTEM FOR A VEHICLE

CROSS-REFERENCE TO RELATED APPLICATIONS

This application is a non-provisional application and claims benefit of U.S. Provisional Patent Application No. 62/989,263; filed Mar. 13, 2020. The disclosure of the above application is incorporated herein by reference.

FIELD OF THE INVENTION

The present invention relates to an intrusion defense system for the computer systems of a vehicle.

BACKGROUND OF THE INVENTION

In the field of ground vehicles, it is common to have cyber-enabled devices that transcend the physical rolling chassis of a ground vehicle. When a ground vehicle needs maintenance or diagnostics performed typically an external diagnostics computer is connected to a ground vehicle through its diagnostic port. This connection is a critical link but is also a point of vulnerability allowing undesirable hacking of the ground vehicle's electronic control unit (ECU) network. The undesirable hacking can occur from different attack vectors, including cyber attacks that originate from the Internet and are transmitted to a controller area network (CAN) bus from wireless devices on the vehicle or through a hardwire connection from an internet enabled computer connecting through the vehicle diagnostics port. Additionally, physical hacking of the system can occur, where a hardwire connection with a rogue node or other man in the middle attacks, where the CAN bus is hacked using a hardwire connection that bypasses the diagnostics port and then imitates a node on the vehicle network.

A common maintenance action for a ground vehicle may be to update the firmware for the engine. This can be for various reasons, like improved power output, more reliable interpretation and diagnostics of fault conditions, or vehicle parameter changes. Regardless of the reason for the update to the ECU, the mechanism involves the diagnostic computer identifying the ECU eligible for the firmware update. It will often send a request to the manufacturer/supplier of the ECU to determine if there is new firmware available. Some systems may customize the firmware distribution based on user defined parameters and compile the distributable machine code from the server to the diagnostics application running on the PC. After the new firmware or parameter updates are obtained on the local PC, a diagnostics session will ensue, and the firmware is transferred to the appropriate ECU over the vehicle network. This usually follows a protocol defined in either the J1939 standard or as defined in the ISO 15765 standard.

One of the big challenges of detecting an intrusion is classifying any unintended code embedded into the firmware being uploaded to the ECU. This is a challenge because the machine code itself is unknown and potentially unique for every ECU. Therefore, any traditional anomaly detection system will not be able to identify a good firmware image from a malicious one. This means, the intrusion defense system must be designed to allow for these updates to occur. At the same time, it must limit the effect of a particular ECU from becoming rogue. To confound the issue, firmwares are often considered to be proprietary, which makes testing and validation of IDS examining the reflashing process even harder. In the end, ECU firmware is preferably digitally signed by the originator (at a minimum). Encrypted firmware could be another improvement.

There is a need to provide an intrusion defense system that detects, logs, reports, mitigates, and defends against outside threats to the confidentiality, integrity and availability of the vehicle and in-vehicle network. There is a need to provide secure in-vehicle communication as well as secure PC-vehicle communication.

SUMMARY OF THE INVENTION

The present invention is directed to a vehicle intrusion defense system (IDS) for performing secure vehicle diagnostics. The vehicle has a plurality of electronic control units (ECUs) on a vehicle connected by a controller area network (CAN) bus vulnerable to third party attacks from one or more attack vectors. A PC running a diagnostics program is used for communicating with the CAN bus to send and receive vehicle diagnostics information over the CAN bus to and from the ECUs. The vehicle includes a diagnostics port connectable to the CAN bus and functions to transmit messages between the PC and the plurality of ECUs via the CAN bus.

The vehicle intrusion defense system further includes secure in vehicle communication hardware connected between the diagnostics port and the CAN bus. The secure vehicle communication hardware includes a secure gateway module that serves as a sentry device for inspecting and logging all diagnostic communications through the diagnostics port. The communications between the PC and the ECUs include a plurality of encrypted controller area network (CAN) messages, which have the vehicle diagnostics information. The diagnostics port and the secure gateway module create a link between the PC and the CAN bus for receiving and transmitting the plurality of encrypted CAN messages between the CAN bus and the PC. Each of the plurality of encrypted CAN messages is encapsulated with escort data that interacts with the diagnostic port gateway to verify that the plurality of encrypted CAN messages are authentic.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The term "diagnostics" as used herein includes diagnosing different problems encountered by the vehicle as well as providing reprogramming and maintenance of the different components within a vehicle communication system 10 as discussed below.

Figure 1:
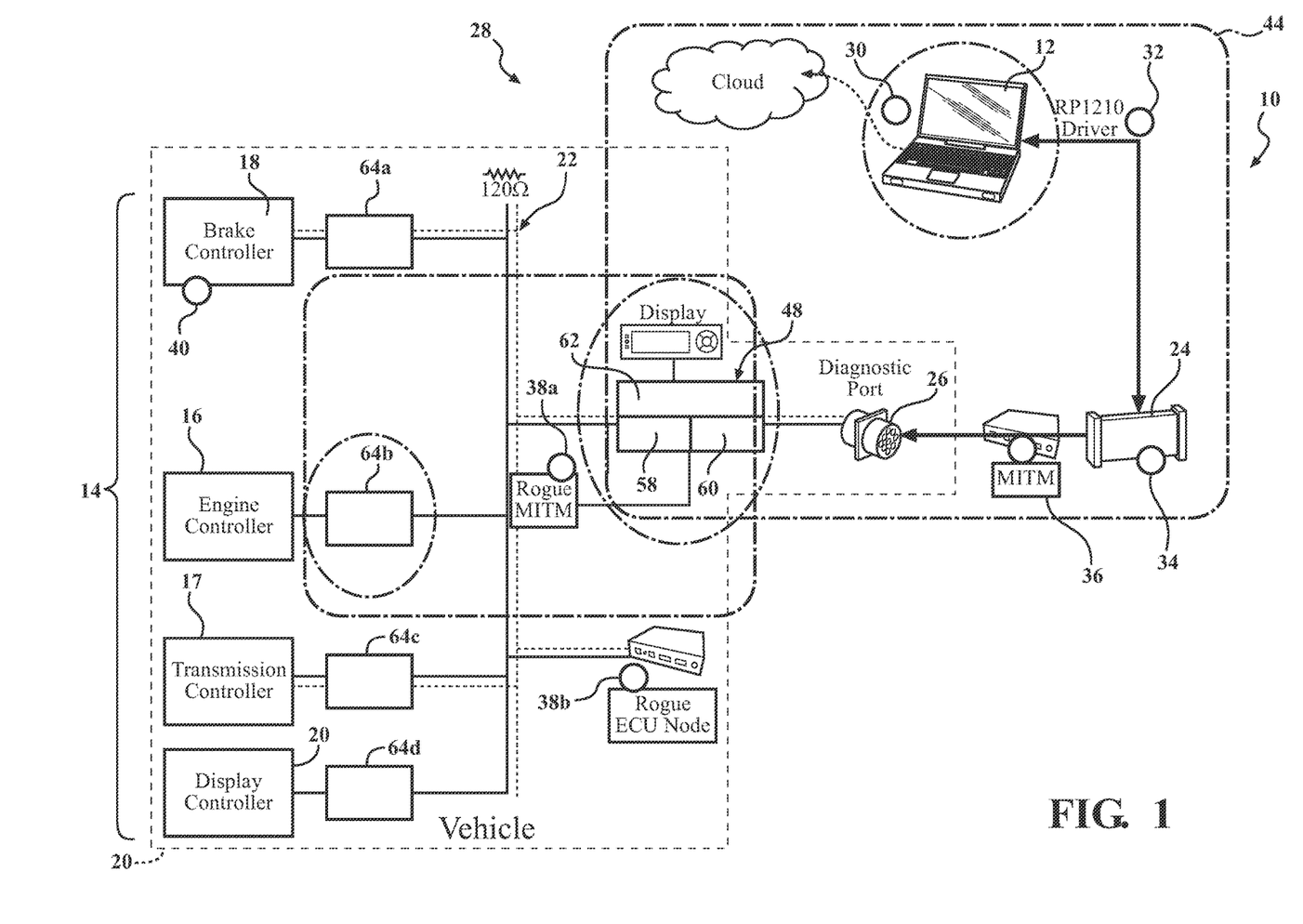
FIG. 1 is a schematic diagram of a vehicle diagnostic communication system with components of an intrusion defense system implemented thereon.

Referring now to FIG. 1 a schematic diagram of the vehicle diagnostic communication system 10 depicting an external computer (PC) 12, which is a personal computer or other outside computer apart from a vehicle, that communicates with a plurality of electronic control units (ECUs) 14 on a vehicle. A vehicle oftentimes has multiple ECUs that have different functions and include but are not necessarily limited to engine control module (ECM), powertrain control module (PCM), Transmission Control Module (TCM), Brake Control Module (BCM or EBCM), Central Control Module (CCM), Central Timing Module (CTM), General Electronic Module (GEM), Body Control Module (BCM), and a Suspension Control Module (SCM). In the present embodiment it is contemplated that the ECUs 14 include an engine control module 16, a transmission control module 17, a brake control module 18 and a display control module 20, all of which are connected to a controller area network (CAN) bus 22 that serves as the vehicle's central communication bus for transmitting and receiving messages for all ECUs 14. The use of CAN bus 22 and ECUs is well established in the prior art and the different standard communications protocols are establish and regulated by the industry.

In order to perform diagnostic analysis of the vehicle, communication between the ECUs 14 and the PC 12 is necessary. The communication language used by the ECUs on the CAN bus 22 can vary depending on the type of vehicle. For heavy vehicles, such as trucks, the communications protocol includes what is referred to as the J1939 protocol. However, the present invention can be used in other vehicles implementing other types of communication protocols, for example ISO15765. While the in-vehicle communications use a certain type of protocol the PC 12 uses an established interface known as Recommended Practice (RP) number 1210, which is the Microsoft Windows application program interface (API) for vehicle diagnostics, that allows the PC 12 to understand and send messages with the ECUs 14.

The PC 12 has a diagnostic adapter 24, which connects to a diagnostic port 26 on the vehicle. The diagnostic port 26 is connectable to the CAN bus 22, thereby allowing PC 12 to send and receive messages with the ECUs 14 over the CAN bus 22. The CAN bus is extended through the diagnostic port 26 to the diagnostic adapter 24 such that on the vehicle side of the diagnostic adapter 24, that connects to the diagnostic port 26, there are dedicated pins that provide one or more lines to the CAN bus 22. On the other side of the diagnostic adapter 24 there is a USB/wi-fi/BT connection to the PC12.

In a typical setting the diagnostic adapter 24 is an RP1210 compliant vehicle diagnostic adapter (VDA) used to link a hard-wired, such as USB, port or a wireless, such as wi-fi or Bluetooth port on the PC 12 with the diagnostic port 26 on the vehicle, which is a CAN off-board diagnostics port. However, for the USB system to operate, a driver must be installed specific to the vendor of the VDA 24. For example, many department of defense (DOD) service shops use the DG Technologies DPA5 as their VDA. The diagnostics software interfaces with the VDA by calling a vendor specific dynamic link library (DLL) usually located in the C:\Windows directory of the PC 12. Once this DLL is loaded, the service software responsible for performing the maintenance action sends data using the RP1210 API. The RP1210 API was originally conceived for Windows 3.1 in the early 1990s and subsequently published as a recommended practice (RP) by the Technology and Maintenance Council (TMC) of the American Trucking Association (ATA). RP1210 is widely adopted by all major original equipment manufacturers (OEMs) and Tier 1 Suppliers.

A typical diagnostics session using the PC 12 with the diagnostic adapter 24 (i.e., RP1210 device) may proceed as follows:

1. The diagnostics software examines the RP1210.ini file to see the available drivers to choose from.

2. Based on the available drivers, the human operator selects the appropriate driver to use with the VDA connected between the truck and the PC 12. Usually, this choice is remembered from one session to the other, but it can be changed.

3. The PC 12 has diagnostics software that makes an RP1210 ClientConnect function call to load the memory with the proper functions and addresses.

4. After a successful client connection, the diagnostics software on the PC 12 usually sends a series of RP1210_SendCommand( ) function calls to setup the driver and VDA 24 for the session. For example, a common command is to SET_ALL_FILTERS_TO_PASS and enable reading every message on the connected bus.

5. The diagnostics session will proceed with a series of RP1210_SendMessage( ) and RP1210_ReceiveMessage( ) function calls to interact with the CAN bus 22 and ECUs 14.

6. Finally, the diagnostic software on the PC 12 will close and issue an RP1210_ClientDisconnect( ) and free the memory resources.

The above process takes place every time the vehicle is examined by a service technician connecting to the diagnostics port 26. Since this can happen hundreds of times in the vehicle lifetime, it is important to recognize these systems as part of the ground vehicle ecosystem and ensure implementing an intrusion defense system (IDS) 28 can address cybersecurity issues with maintenance and diagnostics, which also includes any necessary reprogramming.

The above described vehicle diagnostic communication system 10 has several points of vulnerability to hacking attack, which are referred to herein as attack vectors. The present invention modifies the standard communications methods of the vehicle diagnostic communication system 10 by implementing the IDS 28 that is designed to address all possible attack vectors through which the intrusions may occur during life cycle of operation a vehicle in the field.

Referring now to FIG. 1, the different identified attack vectors will be discussed. Attack vector 30 involves malicious or infected firmware that is transferred to the PC 12 gateway without detection. An example would be malicious or infected firmware that is transferred to the PC through an internet connection. Attack vector 32 occurs between the PC 12 and the diagnostic adapter 24. More specifically attack vector 32 involves hijacking of the VDA driver of the diagnostic adapter 24 using a shim DLL modifying the Windows DLL that interprets the diagnostic commands. Attack vector 34 is when there is rogue embedded firmware installation by attacking the update mechanism that overwrites the VDA embedded firmware on the diagnostic adapter 24. Attack vector 36 is a man-in-the-middle (MITM) intrusion that occurs at the diagnostic port 26. This can occur through a direct hardware connection involving an intended communication mechanism by a physical MITM device.

On the vehicle side of the vehicle diagnostic communication system 10, attack vector 38a, 38b involves the introduction of a rogue node, where a rogue node connected to the CAN bus 22 impersonates legitimate nodes and sends false information—e.g., network flooding. Depending on the sophistication of the Attacker, this node may isolate portions of the network (MITM mode), see attack vector 38a, where the attack occurs from inside the vehicle. The attack vector 38a functions by an attacker receiving messages from one side of the rogue node, modify them (i.e., "the attack') and pass them on to the other side, and in doing so the attacker subverts the intent of the sender of messages. Attack vector 40 involves what is referred to as supply chain tampering, which is where an attacker subverts the modules somewhere in the supply chain, such as in the software or firmware of the ECUs 14.

Attack vector 30 takes place on the side of the PC 12 resulting from attacks from the cloud. This attack vector can be addressed by implementing anti-virus software and suitable firewalls connected to the PC 12. The IDS 28 of the present invention does not require any major changes to the vehicle architecture and can be retrofitted on existing vehicle. The IDS 28 seeks to address and prevent attacks from each attack vector 32, 34, 36, 38a, 38b, 40, 42 by implementing a secure in-vehicle communication arrangement 20 and a secure PC-vehicle communication arrangement 22 that detect, logs, reports, mitigates and defends against outside threats to the confidentiality, integrity and availability of the vehicle and in-vehicle network.

The secure PC-vehicle communication arrangement 44 addresses attack vectors 32, 34, 36. The secure PC-vehicle communication arrangement 44 includes a secure gateway module 48, the diagnostic adapter 24 and PC application algorithm 50 operating on the PC 12 that works with the secure gateway module 48 to formulate a Crypto-DLL during communication sessions with the CAN bus 22, the details of which are described in greater detail below. The secure gateway module 48 is a diagnostic port gateway positioned between the CAN bus 22 and the diagnostic port 26. The secure gateway module 48 includes a filtering module 58, logger module 60 and crypto module 62, all of which permit the secure gateway module 48 to function as a sentry device that inspects and logs all of the diagnostic communications on the diagnostic port 26 side, while the other side that is connected to the CAN bus 22 monitors the communications on the CAN bus 22 and looks for anomalies that may indicate an intrusion from inside the vehicle.

The secure gateway module 48 also provides forensic recording and logging functions that are built into the device. The primary purpose of the secure gateway module is to protect the vehicle from malicious intrusions through the diagnostic port 26. This may be the result of malicious DLLs on the PC 12 at attack vector 32, man in the middle attacks at the diagnostic adapter 24 (i.e., attack vector 36) and wrong firmware on the diagnostic adapter (i.e., attack vector 34). The diagnostic adapter 24 implements the cryptographic functions (i.e., Crypto-DLL) of the PC application algorithm 50 so that they work in conjunction with the secure gateway module 48.

The filtering module 58 of the secure gateway module 48 functions to transfer raw messages downstream (i.e., from the diagnostic adapter 24 to the ECUs 14) and upstream (i.e., from the ECUs 14 to the diagnostic adapter 24). The filter module 58 monitors for illegitimate message and events and then blocks them when found. The filter module 58 also acts upon certain events occurring in the CAN bus 22, such as bus off, bus warning, and channel initialization events. The filter module also can interact with and command the logger module 60 to overwrite exiting messages, record baud rate, flooding, and timing reasonableness of the vehicle diagnostic communication system 10. Lastly the filter module 58 functions to drop all messages that do not pass integrity checks.

The logger module 60 has multiple triggers including high speed change events, ABS events, last stop events, requests for diagnostic sessions, new diagnostic trouble codes, rollover events and airbag deployment events (if needed). Upon occurrence of one of the aforementioned triggers, the logger module 60 will log CAN bus data, log, and securely store last one minute (pre-trigger) of both CAN buses when commanded. The logger module 60 optionally includes the ability to independently sense accelerations and angular velocity for events such as an accident.

The secure PC-vehicle communication arrangement 44 operates using the following strategy. Diagnostic Communication on the PC 12 using the RP1210 API may be prone to cyberattacks, as described above. To mitigate those attacks, securing the link between the diagnostics PC 12 and the secure gateway module 48 is necessary.

The secure gateway module 48 has two CAN interfaces, the diagnostics interface connecting to the diagnostic port 26, and the J1939 interface that connects to the CAN bus 22. The diagnostics interface must have 60 Ohm terminating resistors to permit a CAN high and CAN low transmissions at 60 Ohm each totaling 120 Ohm.

The topology of the connection between the PC 12 and the secure gateway module 48 is a point-to-point link with different protocols (USB and CAN). This means a communication strategy can be implemented that only needs compatibility with each endpoint; 1) the secure gateway module 48, and 2) the RP1210 compliant application on the PC 12.

A limitation of using the typical cryptographic primitives, like Advanced Encryption Standard (AES) 128 encryption, is the limitation of processors and data bytes available in CAN. However, if no other device is participating on the network then the communications over the link can be proprietary. So long as the software CAN interface with RP1210 functions and the vehicle network sees the resulting J1939 messages, then the intermediate can be hardened to mitigate the attack vectors associated with the diagnostics systems.

Figure 2:
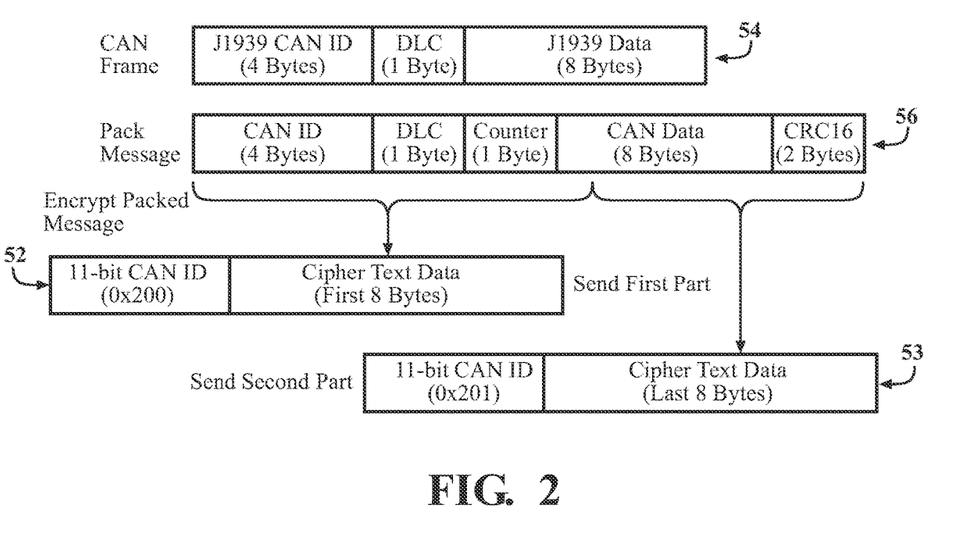
FIG. 2 is a schematic diagram of the makeup of an encrypted CAN message.

FIG. 2 depicts a schematic diagram of the an encrypted CAN message 52, 53. The overall strategy is to encapsulate ordinary (legacy) J1939-based CAN messages, shown as a CAN frame 54 in a secure CAN transport that is referred to herein as the encrypted CAN message 52, 53. An ordinary CAN frame is limited to an 8-byte block of data, so the secure PC-vehicle communication arrangement 44 (shown in FIG. 1) sends the encrypted CAN message 52, 53 as a 16-byte block that is transferred over 2 CAN frames, which are designated herein as encrypted CAN message 52, 53. This is a point-to-point protocol between the PC 12 and the secure gateway module 48. The IDS 28 implements an AES encrypted strategy with symmetric keys exchanged using elliptic curve Diffie-Hillman (ECDH) key exchanges. AES-128 performs encryption on 16-byte blocks. However, CAN messages only use 8 bytes of data. This means we would need to send twice the amount of data per CAN frame to utilize AES encryption. To do this, and maintain bandwidth, the IDS 28 will maximize the speed of the data link between the secure gateway module 48 and the diagnostic adapter 24 and run the secure diagnostics at 1 Mbps (compared to the typical J1939 speed of 250 k).

The secure gateway module 48, using the crypto module 62 employs a hardware security module. A provisioning process is employed wherein the diagnostic application and the hardware security module both generate public-private key pairs. An elliptic curve Diffie-Hellman (ECDH) key exchange then takes place. Thus, each diagnostic session uses ephemeral symmetric session keys that are securely exchanged between the secure gateway module 48 and the PC 12 running the diagnostics application.

The above strategy is summarized as follows:

1. Run the link between the secure gateway module 48 and the diagnostic adapter 24 at 1 Mbps so we can get close to a 2 message to 1 ratio.

2. send/receive 2 encrypted messages for every plain message on J1939.

3. Use the Advanced Encryption Standard (AES), which is a specification for encryption of electronic data established by the U.S. National Institute of Standards and Technology. The present application uses an AES-128, which is a 128-bit key length to encrypt and decrypt a block of messages. More specifically the present application anticipates using an AES-128 in CBC mode to transmit and receive messages. CBC as used herein stands for Cipher Blocker Chaining (CBC), which is an advanced form of block cipher encryption. With CBC mode encryption, each cipher text block is dependent on all plain text blocks processed up to that point.

a. This mode requires a shared secret key. This will be a session key that is randomly generated and shared with each session. It will get rolled into or augment the NAME and Address claim features.

b. A random initialization vector will be needed for each chunk of data. This will be reset periodically during the session, probably after a digital signature of the HASH of the messages is checked.

4. Derive the session key with a secret key derived from the ECDH algorithm:

a. This requires a public key exchange b. The gateway will send a random seed. It will get XORed with the derived secret and hashed with SHA256. The result will be the IV and AES KEY for messages from the Gateway to the New RP1210. As used herein XORed refers to the Boolean logic operation "exclusive OR" (XORed) which compares two input bits and generates one output bit. If the bits are the same, the result is 0. The XOR cipher used in the present invention employs the XOR logical operation in order to encrypt data. First, a random key is generated. Then, XOR operation is performed using the key so that an encrypted data is created. In order to decrypt, the same key should be used and XOR operation should be run again. As used herein SHA is an acronym for Secure Hash Algorithm (SHA) used for hashing data. SHA-256 is a cryptographic hash function that outputs a value that is 256 bits long. Every piece of data produces a unique hash that non-duplicable by another piece of data. Hash functions are not reversible and cannot be decrypted.

c. Similarly, the New RP1210 will send a random seed. It will get XORed with the derived secret and Hashed with SHA256. The result will be the IV and AES KEY for messages from the New RP1210 to the Gateway. IV as used herein stands for initialization vector (IV), which is an arbitrary number that can be used along with a secret key for data encryption.

5. Convert into 16 byte cipher blocks as follows a. First message: ID (4 bytes) DLC (1 byte) COUNTER (3 bytes).

b. Second message: DATA (8 bytes).

6. If we use 11-bit IDs, the first nibble could be a control or a type identifier, for example:

a. 0—All traffic is encrypted from the Gateway to the VDA. The second byte is a counter that keeps the cipher text pairs in order.

b. 1—All traffic is encrypted from the VDA to the Gateway. The second byte is a counter.

c. 2—Session control/Key Exchange.

d. 3—Message Authentication.

e. 4—Escape to ISO15765.

7. After 1 minute or so, validate the messages by comparing the SHA of the bytes sent to the bytes received. We can use an ECDSA to make this comparison, reset the Key and IV and start again. ECDSA as used herein is elliptic curve digital signature algorithm (ECDSA), which is a digital signature algorithm (DSA) that uses keys derived from elliptic curve cryptography (ECC).

Referring to FIG. 2, according to the present embodiment of the invention utilizing the IDS 28 with a heavy vehicle application implementing J1939 communication, the CAN frame includes four bytes of J1939 CAN ID data, 1 byte of data length code (DLC) and 8 bytes of J1939 data. Depending on the direction that the message is going, that is from the secure gateway module 48 to the PC 12 or from the PC 12 to the secure gateway module 48, the PC 12 or the secure gateway module 48 will create the pack message 56. The pack message 56 includes a first message and a second message that add up to 16 bytes, which are the packed plaintext messages. The counter and the CRC values are generated/computed by the sending node to help keep the communication in-sync and provide an additional layer of security. The IV and the key are used to encrypt the 16-byte plaintext to obtain the 16-byte cipher message shown in two blocks of an encrypted CAN message 52, 53. The receiving end will decrypt the cipher message, reassemble the message pairs, check their validity, and get back the decrypted J1939 message. The two block of encrypted CAN message 52, 53 each include an 11-Bit CAN ID block that directs what of the ECUs 14 the message pertains to in addition to an 8 byte cipher text data block that contains the encrypted CAN Data, DLC, counter and CRC16 (data). CRC as used above is cyclic redundancy check (CRC), which is a checksum algorithm to detect inconsistency of data.

Figure 3:
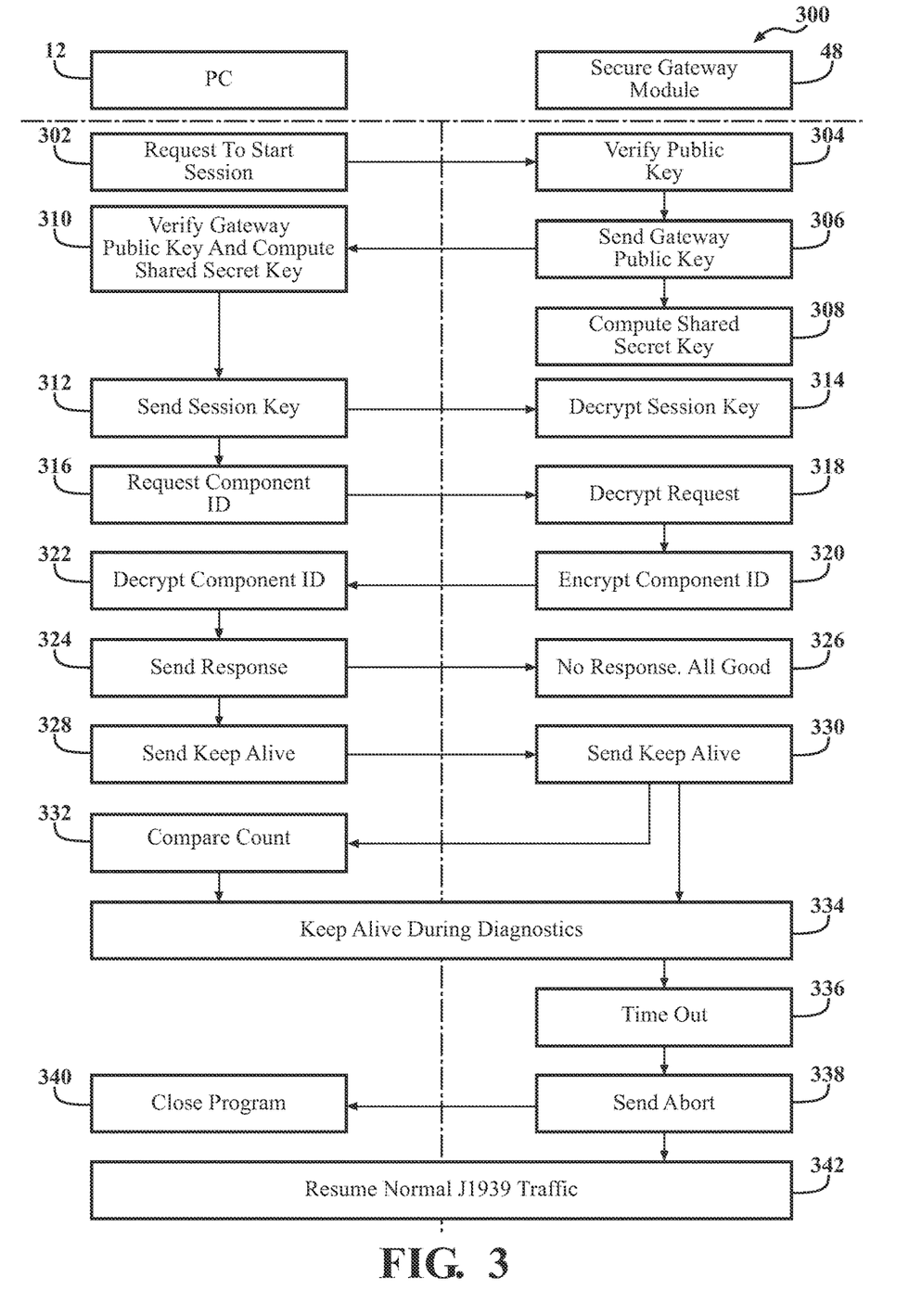
FIG. 3 is a flow diagram outlining a method of secure key exchange and information flow of the secure PC-vehicle communication arrangement.

FIG. 3 is a flow diagram outlining a method of secure key exchange and information flow 300 of the secure PC-vehicle communication arrangement 44 via the diagnostic adapter 24 and diagnostic port 26. During a first step 302 the PC 12 sends a request to start session message to the secure gateway module 48. The secure gateway module 48 performs a step 304 where a verification of the PC's public key is performed, followed by step 306 where the secure gateway module 48 sends a signed gateway public key to the PC 12. The gateway public and private key are generated for each session. Subsequently at step 308 the gateway module 48 computes a shared secret key. Meanwhile the PC at step 310 verifies the gateway public key that will be used and computes a shared secret key. The shared secret key used by the PC 12 and the secure gateway module 48 is preprogrammed in the PC12 and secure gateway nodule 48 during separate processes, referred to as a provisioning process, when the components of the vehicle diagnostic communication system 10 with IDS 28 implemented thereon is assembled. Each diagnostic session begins with the method of secure key exchange 300 the diagnostic application on the PC and the secure gateway module 48 both generate exchange public-private key pairs as described above at step 304, 306, 310, and begins an elliptic curve Diffie-Hellman (ECDH) key exchange that takes place. Each diagnostic session uses ephemeral symmetric session keys that are securely exchanged between the secure gateway module 48 and the PC 12 running the diagnostics application. During step 312 the PC 12 sends a session key to the secure gateway module 48, which at step 314 decrypts the session key.

During a step 316 the PC 12 sends a request for a component ID to the secure gateway module 48, which at step 318 decrypts the sent ID request from the PC. At step 320 the secure gateway module 48 encrypts and sends a component ID message back to the PC 12, which at step 322 decrypts the component ID. Steps 316 through 322 allow the PC 12 to verify that it is communicating with an actual secure gateway module. At step 324 the PC sends an acknowledgment which is received by the gateway module at step 326. Since all is good, there is no response from the secure gateway module 48. The PC-12 will proceed to step 328 and send a keep alive signal to the secure gateway module 48, which at step 330 sends a keep alive signal back to the PC 12. At step 332 the PC 12 performs the step of comparing the count of messages received and messages sent. At step 334 the session is kept alive by sending 'heartbeat' messages during the diagnostics session. If the flow of information through the secure gateway 48 stops or becomes stalled, the heartbeat messages will be interrupted, and at step 336 a time out event is trigged in the secure gateway module 48, followed by a step 338 of sending an abort signal. The PC 12 will proceed to step 340 and close the program and then the secure gateway module will proceed to step 342 and resume normal J1939 traffic on the CAN bus 22. This final step is necessary to maintain vehicle operation in case it is not possible to establish and/or continue with secure communication. In this case, the vehicle is impaired and appropriate measures can be put in place to limit the impact of any cyberattack.

Referring back to FIG. 1 the secure in-vehicle communication arrangement 46 will now be described with regard to how the secure in-vehicle arrangement 46 addresses attack vectors 38a, 38b, 40. The secure gateway module 48 is the primary hardware that coordinates secure in vehicle communication arrangement 46 as well as the vehicle security portion of the secure PC-vehicle communication arrangement 44. The secure gateway module 48 includes the crypto module 62, which is a microcontroller board configured to having cryptography firmware installed that is suitable for use with AES-128 cipher operations in CBC mode. In a preferred embodiment of the invention, a Teensy® 4.0 microcontroller is configured to receive, decrypt, and forward all traffic from the diagnostics port 26 to CAN bus 22. The crypto module 62 facilitates the public and private key implementation (discussed above) using the ECDH (elliptical curve Diffie-Hellman protocol) to pre-calculate the key and establish a crypto key to be used between the PC 12 and the secure gateway module 48 on the PC-vehicle communication arrangement 44.

The crypto module 62 of the secure gateway module 48 also incorporates crypto communication between the secure gateway and a CAN conditioner associated with each of the ECUs 14. The crypto communication involves the public and private key implementation (discussed above) using the ECDH (elliptical curve Diffie-Hellman protocol) to pre-calculate the key and establish a crypto key to be used between the CAN conditioner 64a, 64b, 64c, 64d associated with one of the ECUs 14 and the secure gateway module 48 of the secure in-vehicle communication arrangement 46. Each of the ECUs 14 has its own respective CAN conditioner 64a, 64b, 64c, 64d. The CAN conditioner 64a, 64b, 64c, 64d is designed as a gateway module to protect individual nodes (e.g., ECUs 14) connected to the CAN bus 12. The CAN conditioner 64a, 64b, 64c, 64d is a hardware device physically inserted at each node in close proximity to one of the respective ECUs 14 to form a short point-to-point network with a terminating resistor built into the CAN conditioner 64a, 64b, 64c, 64d. Each of the CAN Conditioner 64a, 64b, 64c, 64d and the secure gateway module 48 include an allow-list and block-list procedure to prevent a variety of unauthorized network attacks.

Each of the ECUs 14 can have multiple source addresses. For example, the engine control module may use SAE J1939 Source Address 0x00 for Engine #1 and Source Address 0x0F for the Engine Retarder. There should be unique source addresses for each controller application (CA) with one or more controller applications per each of the ECUs 14. There should never be a situation where the same source address emanates from different devices. These requirements are written for an SAE J1939 network at 250,000 bits per second. Each CAN Conditioner 64a, 64b, 64c, 64d both monitors and filters the traffic going into and out of a node on a J1939 network. The device calculates a Cryptographic Message Authentication Code (CMAC) according to RFC 4493 (https://tools.ietf.org/html/rfc4493). Each session key is tied to a node and a source address. Since each node has a unique source address, the secure gateway module 48 can calculate the CMAC and keep track of the traffic from each node. This CMAC message acts as a heartbeat indicator for the secure gateway module 48 to verify healthy node behavior and unaltered messaging.

In the present embodiment of the invention there is one CAN conditioner 64a, 64b, 64c, 64d for each of the ECUs 14. Each CAN conditioner 64a, 64b, 64c, 64d has a unique, unalterable identification number and as described below has a programmed provisioning process for bidirectional communication with the secure gateway module 48. Each CAN conditioner 64a, 64b, 64c, 64d is able to securely store a private asymmetric key and a certificate for a root of trust and produce and use random ephemeral keys for each session of use. Each CAN conditioner 64a, 64b, 64c, 64d is also further able to be able to perform authenticated symmetric encryption of messages at 100% bus load and uses a high entropy random number generator for cryptographic operations. Each CAN conditioner 64a, 64b, 64c, 64d is also capable of storing a whitelist of certificates with public keys for authorized diagnostic sessions (i.e., certificate pinning) and an updatable black-list of public keys to handle certificate revocation locally, as well as automatically update the whitelist and black list through a diagnostics utility. The CAN conditioner 64a, 64b, 64c, 64d is also able to limit communications to read-only if trust of a new connection cannot be verified, undergo a trusted one-time provisioning process to generate and load cryptographic keys, and produce a diagnostic message on J1939 if there are issues with the cryptographic diagnostics session.

During creation of the IDS 28 that will be implemented on a vehicle diagnostic communication system 10, each CAN conditioner 64a, 64b, 64c, 64d undergoes a provisioning process that sets up hardware security modules of the CAN conditioner 64a, 64b, 64c, 64d and the secure gateway module 48, to be able to exchange secrets over the CAN bus 22 using the elliptic-curve Diffie-Hellman protocol (ECDH). During the beginning of an encrypted message exchange device keys are exchanged, which is used to setup the ephemeral session keys. The ephemeral session keys are random session keys used to setup an AES-128 cipher in CBC mode and establish a CMAC for the session. The secure gateway modules 48 can still communicate on the J1939 network not using enciphered traffic. Once secrets are exchanged, ephemeral session keys are shared with the secure gateway module 48, which keeps track of the CMACs from each CAN conditioner 64*a*, 64*b*, 64*c*, 64*d*. If a CMAC fails to match, the secure gateway module 48 informs the network using the J1939 Diagnostic Message #1 and a message using the J1939 defined Impostor PG Alert parameter group. Results show the IDS 28 can detect alteration of a message or an impersonated message.

All incoming messages on the CAN bus 22 and outgoing messages from the ECUs 14 must go through the respective CAN conditioner 64*a*, 64*b*, 64*c*, 64*d*. The CAN conditioner 64*a*, 64*b*, 64*c*, 64*d* compares each incoming or outgoing message an allow/block lists to mitigate spoofing attacks. If an incoming message to a node associated with one of the ECUs 14 is on the block list, then the CAN conditioner 64*a*, 64*b*, 64*c*, 64*d* does not forward the message to the respective ECUs 14.

Figure 4:
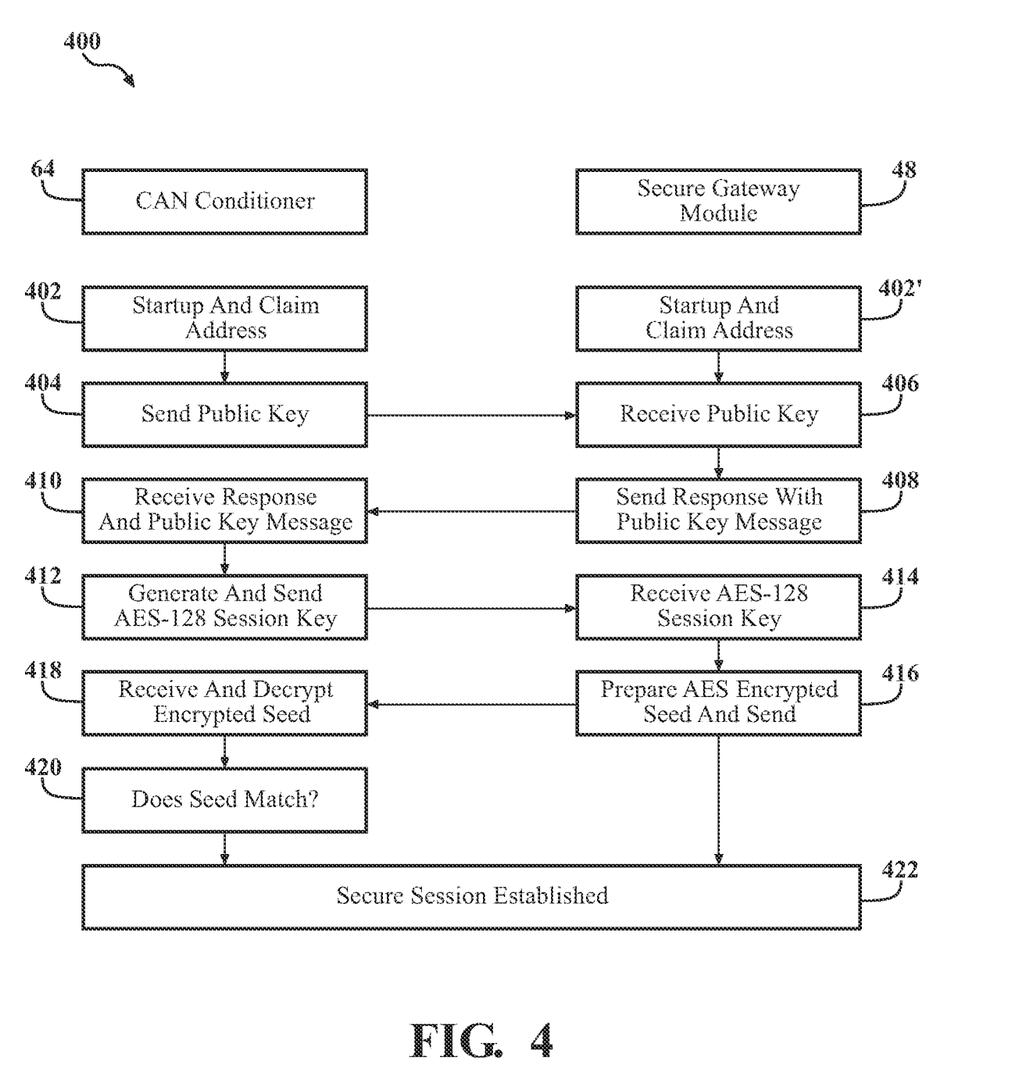
FIG. 4 is a flow diagram outlining a method of secure key exchange and information flow of the secure in-vehicle communication arrangement.

In further detail to the process described above once the secure gateway module 48 and the CAN conditioner 64*a*, 64*b*, 64*c*, 64*d* have been provisioned and connected to the CAN bus 22 a method of secure key exchange 400 as depicted in FIG. 4 is implemented. The method begins with a step 402, 402' performed by both the secure gateway module 48 and the CAN conditioner 64*a*, 64*b*, 64*c*, 64*d*, where both devices startup and claim an address. Then at step 404 the CAN conditioner 64*a*, 64*b*, 64*c*, 64*d* sends a public key message, which at step 406 is received by the secure gateway module 48. The public key message sent at step 404 is broadly facilitated by the transport protocol described in SAE J1939-21. This allows for the transmission of multi-frame messages. It is also facilitated by the data security PGN, DM18, defined in SAE J1939-73, which is used to identify cryptography procedures and information. During step 408 the secure gateway module 48 sends a response to the CAN conditioner 64*a*, 64*b*, 64*c*, 64*d*, which receives the response at step 410 with the public key.

Once both public keys are exchanged at step 412 the CAN Conditioner 64*a*, 64*b*, 64*c*, 64*d* generates and sends a 16-byte AES-128 session key and 10-byte initialization vector using the HSM and sends the pair. At step 414 the secure gateway module 48 receives the data pair, step 416 takes place where the secure gateway module 48 calculates an AES encrypted seed and sends it to the CAN conditioner 64*a*, 64*b*, 64*c*, 64*d*. At step 418 the CAN conditioner 64*a*, 64*b*, 64*c*, 64*d* receives and decrypts the AES encrypted seed and at step 420 checks to see if it matches the AES-128 session key sent to the secure gateway module 48 at step 418. If everything matches then both the CAN conditioner and the secure gateway module 48 proceed to step 422 and a secure session is established.

The key features in the method of secure key exchange 400 are as follows:
1) Private keys are never known or revealed since they exist in the HSM.
2) Pre-shared secrets are calculated by the HSM but never transmitted.
3) Envelope encryption takes place in the HSM.
4) Session keys are ephemeral and securely shared.
5) Public key exchange only needs to take place upon initial installation.

The secure gateway module 48 has certain detailed function requirements relating to the secure in-vehicle communication arrangement 46 that will now be described. The secure gateway module 48 functions to accumulate the messages used to calculate the MAC and calculate its own version and compare the MAC it calculates to the MAC sent from the corresponding CAN Conditioner 64*a*, 64*b*, 64*c*, 64*d*. If they match, then no bits have been flipped or messages dropped. The secure gateway module 48 updates CMACs based on all messages by Source Address using RFC4493. When a DM18 message arrives and contains a CMAC value, the secure gateway module 48 compares it to the internal CMAC. If the CMACs match a counter is started. If the CMACs do not match, increment a fault counter, and send out the following messages on J1939: i. Imposter PG Alert ii. DM1 with SPN 1597, FMI 19. The secure gateway module 48 also sends out a reset command using the Data Security Message (DM18).

The CAN conditioner 64*a*, 64*b*, 64*c*, 64*d* has certain detailed functional requirements, which will now be described. The CAN conditioner 64*a*, 64*b*, 64*c*, 64*d* is configured to filter messages coming from the ECU to the J1939 network and then forward the message to J1939 if it is in the whitelist. When messages are transmitted from the respective ECUs 14 to the CAN conditioner 64*a*, 64*b*, 64*c*, 64*d* only messages with the correct J1939 source address(es) (SA) and appropriate PGNs will be allowed out of the ECUs 14. If a message is determined to not be on the whitelist, the CAN conditioner 64*a*, 64*b*, 64*c*. 64*d* will drop the message and transmit an imposter alerts (i.e., an imposter PG alter on J1939). The CAN conditioner 64*a*, 64*b*, 64*c*, 64*d* will also transmit a DM1 message with SPN 10841 and FMI 12 on J1939. The CAN conditioner 64*a*, 64*b*, 64*c*, 64*d* also ensures message timing for each allowable ID that is maintained. The CAN conditioner 64*a*, 64*b*, 64*c*, 64*d* will not send messages if the update rate is too soon (i.e., no earlier than 80 ms for a 100 ms period). Also, any inappropriate address claims are not forwarded to the CAN conditioner 64*a*, 64*b*, 64*c*, 64*d*. If the CAN conditioner 64*a*, 64*b*, 64*c*, 64*d* detects that any filtering rules are violated, then a fault code is set and transmitted on J1939 to trigger logging and inform the user.

The CAN conditioner 64*a*, 64*b*, 64*c*, 64*d* also performs filtering of messages coming from J1939 network to the ECU. During the filtering process the CAN conditioner 64*a*, 64*b*, 64*c*, 64*d* will block any messages with the same source addresses as the protected ECU, send a fault code if a message with the SA of the protected ECU is found on the J1939 network, and pass only messages with the correct destination addresses (either ECU specific or global addressing).

During the provisioning process the CAN conditioner 64*a*, 64*b*, 64*c*, 64*d* allows secure exchange session keys with the secure gateway module 48 by creating and storing a secret private key based on the P256 Elliptic Curve and a symmetric AES Key. Each CAN conditioner 64*a*, 64*b*, 64*c*, 64*d* will have its memory mapped.

The CAN conditioner 64*a*, 64*b*, 64*c*, 64*d* also cryptographically authenticates messages coming from the ECUs 14 using an AES-CMAC, buffer all the messages sent within a certain amount of time (i.e., 2 seconds) will be used to calculate a message authentication code (MAC). The CAN conditioner 64*a*, 64*b*, 64*c*, 64*d* also generates a beacon CAN frame that is sent out with high priority that contains the MAC metadata. Every 1 second, it sends a Data Security message on J1939 that includes the first 6 bytes of the CMAC. The CAN conditioner 64*a*, 64*b*, 64*c*, 64*d* monitors the CAN bus 22 to detect any anomalies, such as if the bus load is too high, and initiates a recording trigger. This may be a result of a reprogramming event. Another anomaly detection process performed by the CAN conditioner 64a, 64b, 64c, 64d involves tracking of CAN error frames. If a bus off attack is initiated, then the error frames will be a symptom.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle intrusion defense system for performing secure vehicle diagnostics comprising:
    a plurality of electronic control units (ECUs) on a vehicle connected by a controller area network (CAN) bus vulnerable to third party attacks from one or more attack vectors;
    an external computer (PC) having a program that sends and receives vehicle diagnostics information over the CAN bus of the vehicle;
    a diagnostics port connectable to the CAN bus of the vehicle for transmitting messages between the PC and the plurality of ECUs via the CAN bus;
    a secure PC-vehicle communication arrangement connected between the diagnostics port and the CAN bus, the secure PC-vehicle communication arrangement includes a secure gateway module that serves as a sentry device for inspecting and logging all diagnostic communications through the diagnostics port;
    a plurality of encrypted controller area network (CAN) messages, which include the vehicle diagnostics information transmitted between the PC and the secure gateway module, wherein the plurality of encrypted CAN messages is encapsulated with escort data that interacts with the diagnostic port gateway to verify that the plurality of encrypted CAN messages are authentic; and
    wherein the diagnostics port and the secure gateway module create a link between the PC and the CAN bus for receiving and transmitting the plurality of encrypted CAN messages between the CAN bus and the PC.

2. The vehicle intrusion defense system of claim 1 wherein the plurality of ECUs includes two or more selected from the group comprising a brake controller, an engine controller, a central electronic control unit, media controller, and transmission controller.

3. The vehicle intrusion defense system of claim 1 wherein the secure diagnostic port gateway has two CAN interfaces with the CAN bus including a diagnostics interface connected to the diagnostic port and a J1939 interface connected to the rest of the vehicle.

4. The vehicle intrusion defense system of claim 2 wherein the diagnostics interface includes one or more 60 ohm termination transistors.

5. The vehicle intrusion defense system of claim 1 wherein the plurality of CAN messages contain a diagnostic portion and an encryption portion.

6. The vehicle intrusion defense system of claim 5 wherein the plurality of CAN messages each are a 16 byte block transferred over two 8 byte CAN frames.

7. The vehicle intrusion defense system of claim 2 wherein the secure PC-vehicle communication arrangement is operated at a speed of at least one Mbps to accommodate performing secure diagnostics using the plurality of encrypted CAN messages.

8. The vehicle intrusion defense system of claim 1 further comprising a secret key that is shared between the PC and the secure gateway module, wherein each encrypted portion the plurality of encrypted CAN messages includes a cipher that is an advanced encryption standard (AES) 128 cipher used by the secure gateway module and the PC to verify the authenticity of the plurality of encrypted CAN messages.

9. The vehicle intrusion defense system of claim 1 further comprising:
    a secure in-vehicle communication arrangement connected between the plurality of ECUs and the diagnostics port, the secure in-vehicle communication arrangement includes a secure gateway module that serves as a sentry device for inspecting and logging all diagnostic communications from the plurality of ECUs; and
    a plurality of encrypted controller area network (CAN) messages, which include vehicle diagnostics information transmitted between the ECUs and the secure gateway module.

10. The vehicle intrusion defense system of claim 9 wherein the secure in-vehicle communication arrangement further comprises a CAN conditioner between each of the plurality of ECUs and the secure gateway module, wherein the plurality of encrypted CAN messages are generated using an AES-128 encryption session key between each CAN conditioner and the secure gateway module.

11. The vehicle intrusion defense system of claim 10 wherein the secure gateway module includes a crypto module which is a microcontroller that has been provisioned with AES-128 encryption capability, a filtering module that monitors and block messages that are determined to be from the one or more attack vectors and a logger module that records and logs incidents of attack from the one or more attack vectors.

12. The vehicle intrusion defense system of claim 10, wherein each CAN conditioner monitors and filters the traffic going into and out of a node on a J1939 network and the encryption session key is established by the CAN conditioner calculating a Cryptographic Message Authentication Code (CMAC) that is specific to each node that acts as a heartbeat indicator for the secure gateway module to verify healthy node behavior and unaltered messaging, thereby allowing the secure gateway module to monitor traffic from each node.

13. The vehicle intrusion defense system of claim 10 wherein each CAN conditioner performs a filtering of messages coming the CAN bus by blocking messages with the same source address as a select one of the plurality of ECUs that the CAN conditioner is protecting and each CAN conditioner is also capable of storing a whitelist of certificates with public keys for authorized diagnostic sessions and an updatable black-list of public keys to handle certificate revocation locally, as well as automatically update the whitelist and black list through a diagnostics utility.

14. A vehicle intrusion defense system for performing secure vehicle diagnostics comprising:
    a plurality of electronic control units (ECUs) on a vehicle connected by a controller area network (CAN) bus vulnerable to third party attacks from one or more attack vectors;
    an external computer (PC) having a program that sends and receives vehicle diagnostics information over the CAN bus of the vehicle;
    a diagnostics port connectable to the CAN bus of the vehicle for transmitting messages between the PC and the plurality of ECUs via the CAN bus;

a secure PC-vehicle communication arrangement connected between the diagnostics port and the CAN bus, the secure PC-vehicle communication arrangement includes a secure gateway module that serves as a sentry device for inspecting and logging all diagnostic communications through the diagnostics port;

a plurality of encrypted controller area network (CAN) messages transmitted on the secure PC-vehicle arrangement, which include the vehicle diagnostics information transmitted between the PC and the secure gateway module, wherein the plurality of encrypted CAN messages is encapsulated with escort data that interacts with the diagnostic port gateway to verify that the plurality of encrypted CAN messages are authentic;

wherein the diagnostics port and the secure gateway module create a link between the PC and the CAN bus for receiving and transmitting the plurality of encrypted CAN messages between the CAN bus and the PC;

a secure in-vehicle communication arrangement connected between the plurality of ECUs and the diagnostics port, the secure in-vehicle communication arrangement includes a secure gateway module that serves as a sentry device for inspecting and logging all diagnostic communications from the plurality of ECUs;

a plurality of encrypted controller area network (CAN) messages transmitted on the secure in-vehicle communication arrangement, which include vehicle diagnostics information transmitted between the ECUs and the secure gateway module; and wherein the secure gateway module includes a crypto module which is a microcontroller that has been provisioned with AES-128 encryption capability, a filtering module that monitors and block messages that are determined to be from the one or more attack vectors and a logger module that records and logs incidents of attack from the one or more attack vectors.

15. The vehicle intrusion defense system of claim 14 wherein the plurality of ECUs includes two or more selected from the group comprising a brake controller, an engine controller, a central electronic control unit, media controller, and transmission controller.

16. The vehicle intrusion defense system of claim 14 wherein the secure diagnostic port gateway has two CAN interfaces with the CAN bus including a diagnostics interface connected to the diagnostic port and a J1939 interface connected to the rest of the vehicle.

17. The vehicle intrusion defense system of claim 16 wherein the diagnostics interface includes one or more 60 ohm termination transistors.

18. The vehicle intrusion defense system of claim 14 wherein the plurality of CAN messages contain a diagnostic portion and an encryption portion.

19. The vehicle intrusion defense system of claim 18 wherein the plurality of CAN messages each are a 16 byte block transferred over two 8 byte CAN frames.

20. The vehicle intrusion defense system of claim 14 wherein the secure PC-vehicle communication arrangement is operated at a speed of at least one Mbps to accommodate performing secure diagnostics using the plurality of encrypted CAN messages.

21. The vehicle intrusion defense system of claim 14 further comprising a secret key that is shared between the PC and the secure gateway module, wherein each encrypted portion the plurality of encrypted CAN messages includes a cipher that is an advanced encryption standard (AES) 128 cipher used by the secure gateway module and the PC to verify the authenticity of the plurality of encrypted CAN messages.

22. The vehicle intrusion defense system of claim 14 wherein the secure in-vehicle communication arrangement further comprises a CAN conditioner between each of the plurality of ECUs and the secure gateway module, wherein the CAN conditioner and the secure gateway module, wherein the plurality of encrypted CAN messages are generated using an AES-128 encryption session key between each CAN conditioner and the secure gateway module.

* * * * *